July 17, 1956 J. P. A. DONJON 2,755,375
REMOTE FREQUENCY CONTROL
Filed June 7, 1951 5 Sheets-Sheet 1
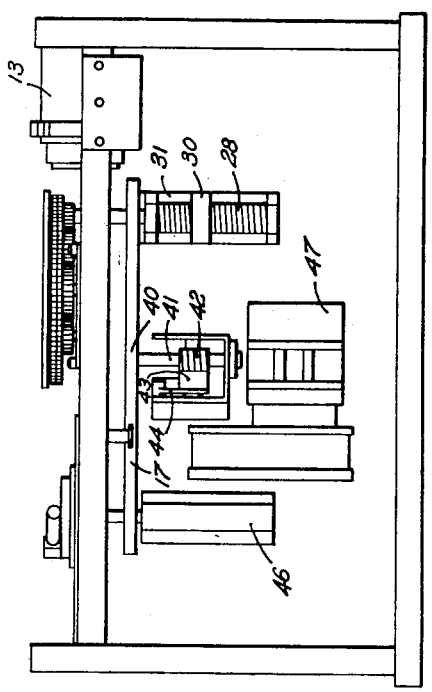
Fig. 2.
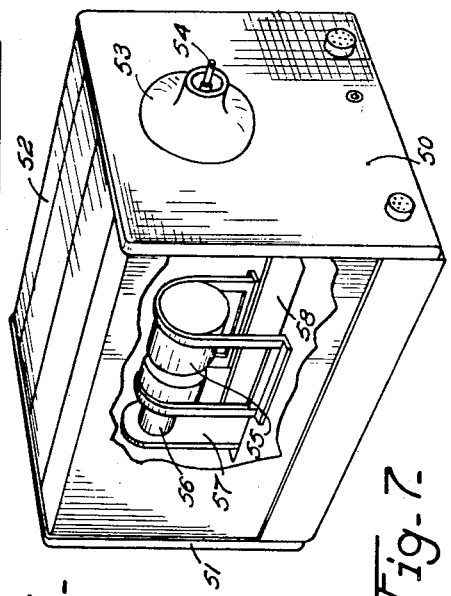
Fig. 3.
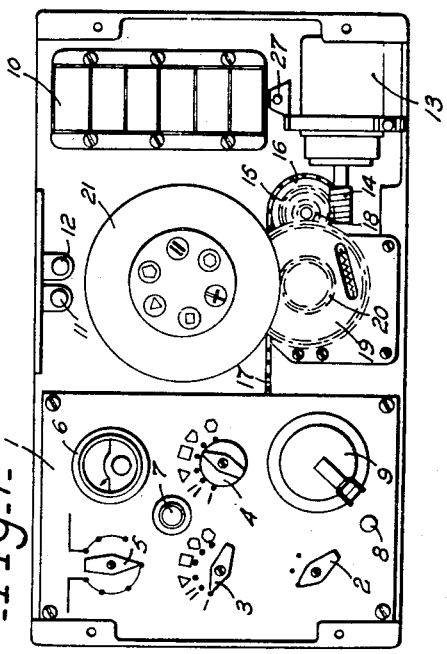
Fig. 1.
Fig. 7.
Inventor
Jacques Pierre André Donjon
By Michael S. Striker July 17, 1956 J. P. A. DONJON 2,755,375
REMOTE FREQUENCY CONTROL
Filed June 7, 1951 5 Sheets-Sheet 2
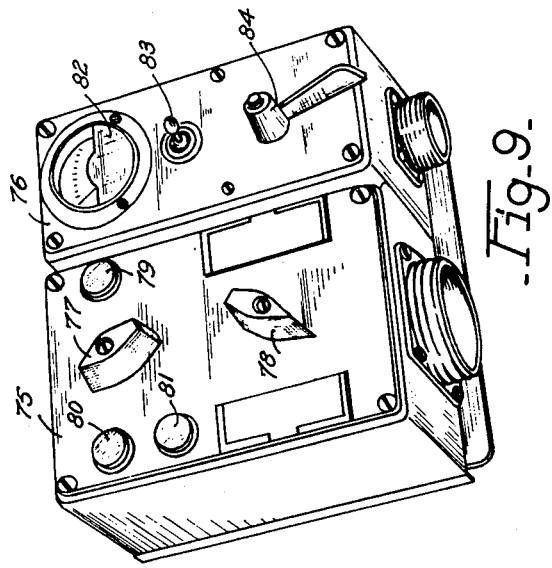
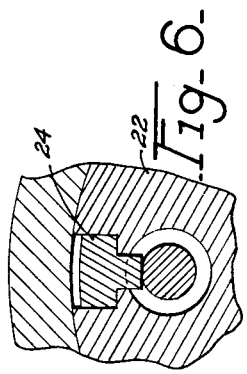
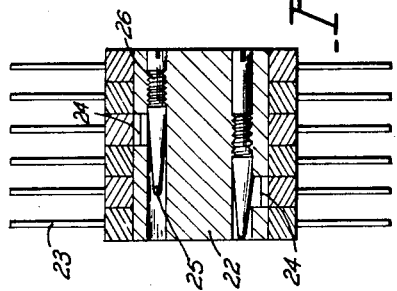
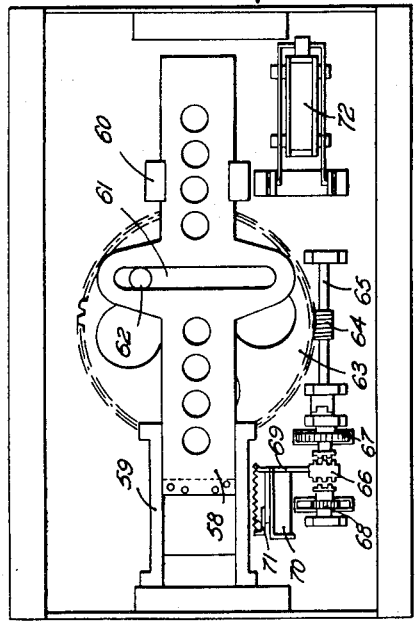
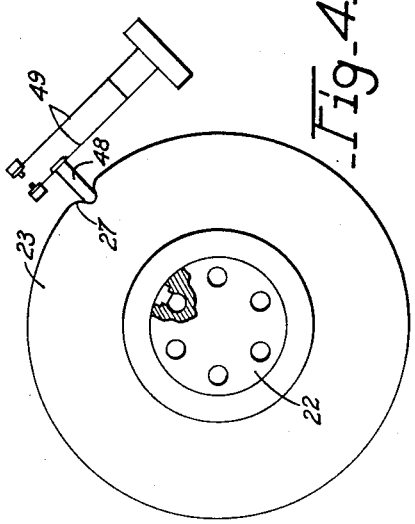

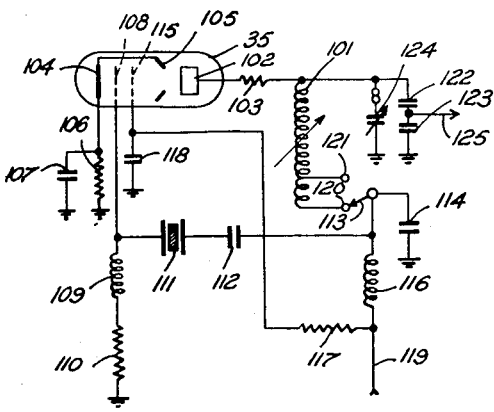
_Fig. 10_
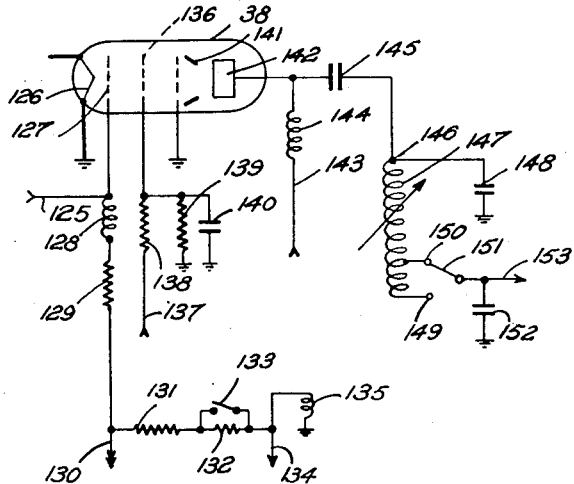
_Fig. 11_
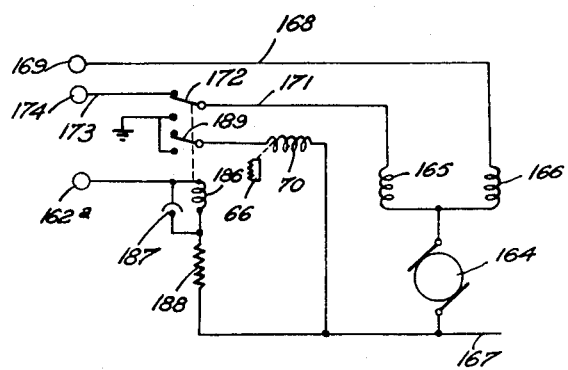
_Fig. 14_

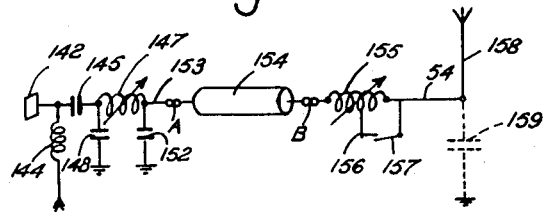
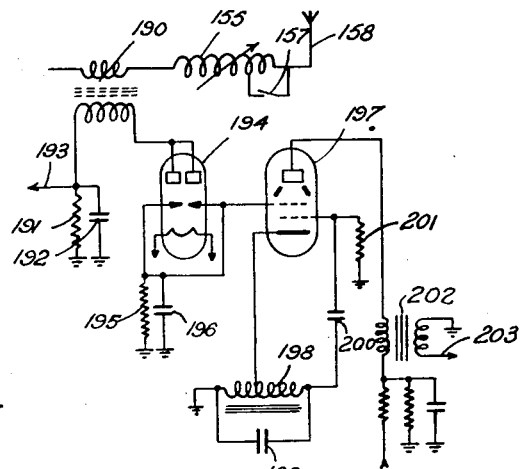
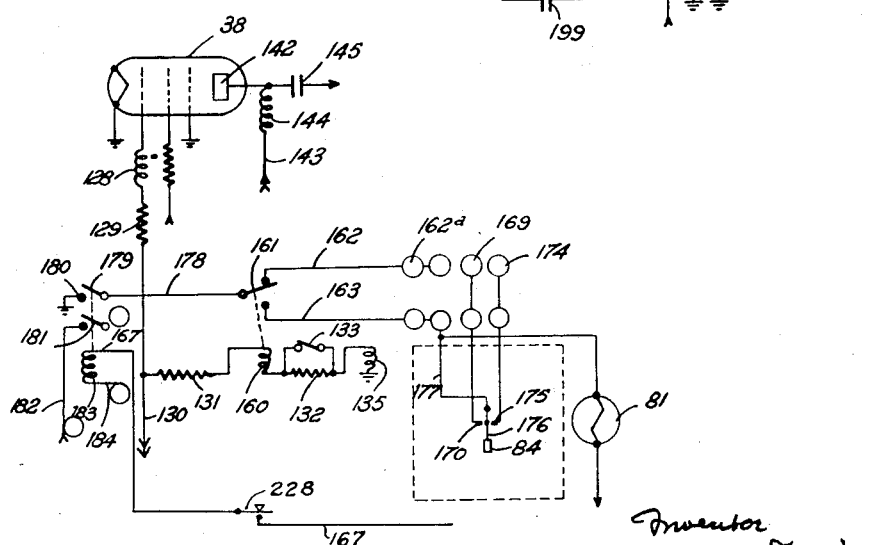

United States Patent Office 2,755,375
Patented July 17, 1956

2,755,375
REMOTE FREQUENCY CONTROL

Jacques Pierre André Donjon, Paris, France, assignor, by mesne assignments, to Bendix Aviation Corporation, New York, N. Y.

Application June 7, 1951, Serial No. 230,303

3 Claims. (Cl. 250—17)

Transmitters of electromagnetic waves intended for radio-communication and mounted on board of vehicles such as aircraft are subject to space limitations which oblige the manufacturer to provide them in various separate parts. Thus, the transmitter frame proper may be mounted very far from the radio operator's station which in turn is located a considerable distance from the various sending aerials, generally two in number, viz.: trailing course aerial and a fixed aerial which is used for approaching manoeuvers when the trailing aerial is retracted.

Such apparatuses are already known which comprise an aerial tuning box in the neighborhood of the outlets of the aerials out of the hull or body of the vehicle, said aerial boxes being connected through co-axial cables to the transmitter-amplifier unit which is mounted at the most favourable point of the vehicle for the purpose of its maintenance and repair. The presence of such connections of great length has generally a considerable influence on the efficiency of the equipment.

Since the sending apparatuses of the above mentioned kind are intended for the sending of signals on a plurality of frequency bands and in a plurality of ranges it is indispensable that the operator should be able, through a remote control device to effect the necessary tuning to the selected frequencies.

The present invention has for one of its first objects to improve the remote control arrangements which make it possible for the operator to effect through a remote control the tuning operation required for the selection of the sending frequency, both on the transmitter itself and on the aerial tuning box.

Another and more specific object of the invention is to improve the efficiency of transmission by almost completely doing away with the influence of the connections through co-axial cables.

In accordance with the present invention the apparatus for transmitting electromagnetic oscillations for radio-telegraphic or radio-telephonic communications comprises an oscillator separated from an aerial tuning coil in which apparatus oscillator tuning is effected through means for displacing a tuning member in combination with means for arresting said member in preselected positions, said displacing means being—or not—remote controlled, relays the energization of which is caused directly or indirectly through the aerial current insuring the displacement and the arresting of the adjusting means for the tuning winding of the aerial in a rapid but approximate manner, the value of said aerial current being then readable directly or indirectly at a distance by an operator on a measuring instrument, means at the disposal of the operator being provided in order to make it possible for him to effect at a distance a slow and precise adjustment of the aerial tuning winding which brings the aerial current to its maximum value.

To this end the transmitter which, more particularly, comprises an amplifier stage, is provided with coils each with a movable core, said movable cores being shifted simultaneously and by equal distances in said coils by a motor which drives a device for the control of the positions reached by the cores. This control device makes it possible to stop the motor when the position of the cores corresponds to the adjustment of the frequencies transmitted and amplified and displayed on a central contactor which is at the disposal of the operator.

The arresting positions of the cores are previously determined in the laboratory or in the workshop.

The tuning of the aerial box is obtained in two steps: first, the rapid and aproximate tuning step, being determined by the action of relays acted upon by the aerial current, said relays arresting the rotation of the tuning motor which acts on a magnetic core also suitable when the aerial current nears a maximum, and a precise adjustment which the operator effects by imparting to the aerial motor impulses which correspond to direct comparison readings of the aerial current by means of a direct control device which is at his disposal.

In a particular form of execution of such an equipment the displacement of the tuning cores in the transmitter itself as well as in its amplifier and in its aerial tuning box is effected alternately in one direction or in the other, the change of direction being imposed by reversing devices as the cores reach the end of their stroke.

The cores relating to the oscillator and the amplifier are, in this case, controlled through nuts moving screws, the rotation of the screws being caused by a motor having associated for rotation therewith a set of notched discs, the notches serving to control the contactor for stopping the motor. This actuating motor also drives a release device which actuates a set of contactors. Some of these contactors form the reversing switches for reversing the operation of the motor while others connected with the former ones form range changers which through intermediate taps modify the useful lengths of the tuning windings in the different stages.

The tuning core of the aerial box is driven through a connecting rod and crank system and effects its reciprocating movement for a single direction of rotation of the tuning motor. The control of the connecting rod and crank system has an automatic change of speed providing a high speed during the rapid and approximate tuning step and a geared-down speed for the fine adjustment step. The change of range in the aerial tuning box results from the action of a relay controlled by a contactor actuated by the quick-acting releasing device of the oscillator-amplifier casing.

With a view to reducing the influence of the coaxial conductor in the efficiency of the aerial, although the length of the co-axial conductor may reach a considerable value, the control circuit of the amplifier is a "pi"-shaped circuit the side brances of which are capacities whereas the intermediary or cross branch is the tuning coil itself. The co-axial conductor is arranged in parallel with the terminal capacity of said "pi"-shaped circuit and this capacity is high with respect to the distributed capacity of the co-axial conductor.

The following description given with reference to the accompanying drawings in which non limitative examples of execution will show how the invention may be performed.

Figure 1 is a front view showing the front panel of the transmitter.

Figure 2 is an overhead view of the transmitter.

Figure 3 is a corresponding view from below.

Figure 4 is a diagrammatical view showing a control disc with its circuit-breaker.

Figure 5 is an axial section showing the stock of discs and securing means.

Figure 6 is a radial section showing a securing key.

Figure 7 is a perspective view with parts broken away of the protection shielding showing an aerial tuning box.

Figure 8 is a view from below of this tuning box.

Figure 9 is a perspective view showing the connection of the remote control box for the approximate tuning with the remote control box for the precision tuning.

Figure 10 shows the basic wiring diagram of the oscillator unit.

Figure 11 shows the diagram of the power amplifier unit.

Figure 12 shows the diagram of the aerial coupling circuits.

Figure 13 shows the diagram for the tuning equipment circuits.

Figure 14 shows the diagram for the aerial tuning motor feed circuits.

Figure 15 shows the diagram for the direct control device for the aerial circuits having an amplifier device associated therewith for audibly listening into the keying operation with a head-set.

Figure 16:
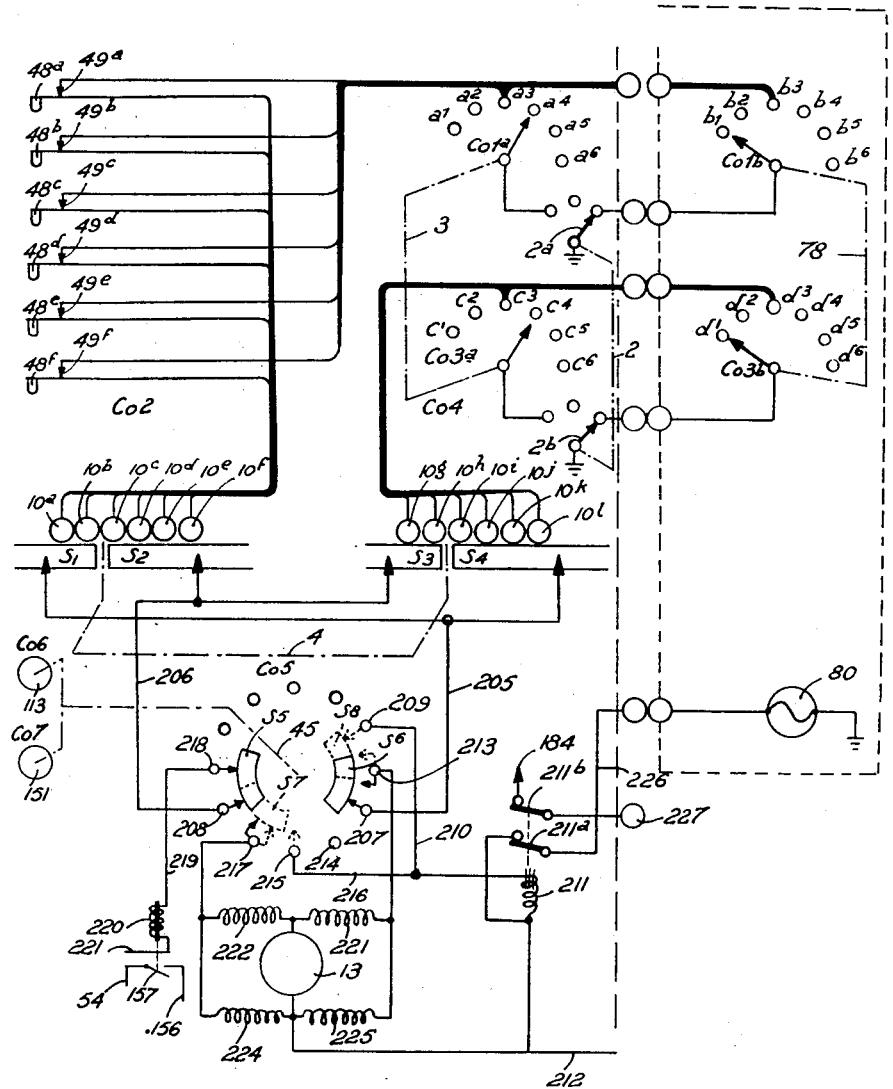
Figure 16 represents the diagram of the transmitter tuning circuits.

As may be clearly seen on Figure 1 the transmitter box comprises an approximate or direct adjustment panel 1 provided with the following components:

A 3-positional switch handle 2 the middle position of which corresponds to the arrested condition while its side positions respectively correspond to approximate adjustment and remote control;

A switch handle 3 for frequency selection;

A switch handle 4 for the distribution of the frequency standards between two ranges;

A multi-positional switch handle 5 for feeding a measuring instrument 6 comprising a milli-ammeter-voltmeter with currents tapped at the different control points on the transmitter;

A push-button 7 for switching on the apparatus 6;

A push-button 8 for the control of a general safety circuit breaker;

A rocking button 9 with a handle for manual frequency adjustment.

On the apparatus, a front view of which is shown on Figure 1, the covering panel of the right hand part of the apparatus is supposed removed. Then the following accessories appear:

The boxes 10 for the crystals, said boxes being sealed and provided with two plugs removably inserted into sockets on the frame;

Two indicating signals 11, 12;

A tuning motor 13 the shaft of which carries a worm drivingly meshing with a gear 15. The shaft of gear 15 carries a sprocket pinion 16 with which a chain 17 engages. The same shaft carries a gear 18 meshing with a gear 19 provided with backlash adjusting means, the gear 19 being fast with a pinion 20 meshing with a gear provided with backlash adjusting means and fast on the shaft of dial 21.

The shaft of dial 21 is fast with a hub 22 having six notched discs 23 rotatable thereon which can be fixed in position by blocking keys 24. Said keys are distributed in six regularly spaced axial planes and their position axially of the hub is such that each key 24 bears inside only one of the sockets to which a disc 23 is secured. Keys 24 are applied below said socket by the tapering end part 25 of a screw 26 having its head sunk into hub 22. The screws 26 are provided with heads of suitable lengths positively preventing errors in positioning.

With this device it is possible to adjust the angular position of the notches 27 of discs 23 with respect to hub 22 and to lock said discs in any selected position.

Button 9 is mounted on a spindle which also carries a sprocket pinion strictly identical with pinion 16. Chain 17 is endless; it may be seen that dial 21 and discs 23 can be rotated either by means of motor 13 or by means of handle 9. To this end motor 13 can be disconnected, for example by a rocking movement of this motor about an axis 27, such rocking movement moving the screw 14 away from or towards gear 15, both positions of the motor being fixed by yielding latch means.

The shaft of handle 9 and the shaft of pinion 15 are each provided with screw threaded extensions 28, 29. Engaged on said screw threaded extensions are nuts such as nut 30. Said nut 30 is provided with projections whereby it is guidably slidable in slot 31 in the bottom wall of the transmitter unit. Said nut 30 is extended by a small plate 32 which passes through said bottom wall and maintains at its upper part a magnetic core 33 sliding in the insulating support 34 of a winding to be described later. Said winding forms part of an oscillatory circuit which comprises an electronic tube 35.

Arranged on screw 29 are similar elements and the sliding core 36 is capable of adjusting the inductance value of a tuning winding to be described later and mounted on a tubular support 37, said tuning winding forming a part of circuits which comprise an amplifier valve 38.

It may be seen that owing to the above arrangement the displacements imparted to cores 36 and 33 are strictly equal, the pitch of screw threads 28 and 29 being equal and said screws turning in a synchronous manner under the action of chain 17.

Chain 17 itself moves over a substantially triangular path while passing on both pinions which are similar to pinion 16 and driving an additional pinion 40 arranged between both pinions 16. Said pinion 40 is fast with a shaft 41 on which a screw 42 is secured. Said worm 42 meshes with gear teeth formed on a block 43 carrying a rocking handle 44 the end of which is formed as a finger. Said rocking finger is adapted to engage a releasing switch having two positions and adapted for quick positional reversal, said releasing switch controlling change-over switches to be described later.

Slot 31 which surrounds the screw remains clear while the corresponding slot for screw 28 is covered by a tight-fitting cover. Arranged under the bottom of the transmitter is a fan the rotor of which is enclosed in a housing 46, said rotor being driven from a motor 47.

Notches 27 of discs 23 are adapted to receive actuating fingers 48 of circuit breakers with two spring-contacts 49 which establish contact when finger 48 is supported by the circular portion of disc 23 and which breaks contact when finger 48 moves down into notch 27, the spring contacts being biassed in order to tend to move away from each other. Said circuit breakers are arranged in two groups of three circuit breakers only one of which is shown on Figure 2.

The transmitter equipment also comprises at least one areial box shown in Figures 7 and 8. Said aerial box is contained in a housing both ends of which are shielded by the metallic end-walls 50 and 51, the cover 52 which interconnects the end walls comprising a shielding formed of strips placed on an insulating wall. However, said strips are connected electrically to end-walls 50 and 51. End wall 50 has secured into it an insulator 53 for the outlet of aerial wire 54.

The aerial is tuned by means of a winding 55 into which a magnetic core 56 can be adjustably inserted. Said core 56 is carried by a small plate 57 perpendicular to the core and moving in a slot 58 of the bottom wall of the aerial box. The plate 57 extends through the bottom wall and is connected to a slide 58 suitably guided in channels 59, 60 fast with the underpart of the bottom wall. Slide 58 is formed with a slot 61 perpendicular to the direction of its displacement and in which a rolling finger 62 fast with a wheel 63 may move. Said wheel 63 rotates about a shaft secured to the bottom wall and is formed on its periphery with teeth engaging a worm 64 carried by a shaft 65. Said shaft has splined to it a clutching dog 66 having double opposed rows of teeth and the action of which makes it possible to drivably connect shaft 65 either with a wheel 67 or with a pinion 68 mounted for free rotation with respect to said shaft. Pinion 68 and gear 67 constantly engage two corresponding gears fast with the shaft of an electric motor not shown in Figure 8. Since said motor has a constant speed it is possible by this means to obtain two speeds of rotation for shaft 65. The clutching dog is actuated by the movable vane of a relay 70 and urged back to one of its end positions by a spring 71 when relay 70 is not energized.

Also appearing below the bottom wall of the aerial box is a plunger relay 72 actuating through a reversing stirrup the connecting gear of a contactor having two positions adapted to switch into or out of circuit, part or all of the aerial tuning winding during the frequency range changing operations as will appear later.

The remote control for the change of transmission frequency is obtained by means of change-over switches carried by the inner wall of two small casings 75, 76 shown on Figure 9. Casing 75 comprises a 3-positional change-over switch 77, including a waiting position, a transmitting position over a first aerial and a transmitting position over a second aerial. The equipment is so devised that it can serve two aerials: a course aerial and an approaching aerial for an aircraft. Another change-over switch the actuating handle 78 of which is visible on the drawing has six positions corresponding to the six sending frequencies. Furthermore, three signal lamps 79, 80 and 81 are provided. Lamp 79 when illuminated indicates that the apparatus is in operating condition, i. e. that voltage has been applied to it through the above mentioned releasing switch. Illumination of lamp 80 indicates that the remote tuning operations have been carried out; and signal lamp 81 visibly repeats the movements imparted to the sending signalling key.

Further mounted on casing 76 is a measuring instrument 82 comprising a milli-ammeter with relative indications, a change-over switch with two positions 83 for the connection of said indicator 82 to the taps of two separate aerials, and a change over switch with two positions 84 the contact strip of which is urged back to its neutral position together with its operating shank (as shown in the drawing) by a resilient return device.

The mechanical arrangement of the equipments used having thus been described the electrical arrangements will now be described. It is understood that the supply circuits and the various safety accessories, which are all known were not mentioned nor do they require any particular description. Power supply is provided as is usual with transmitters of this type from a low voltage direct current source or from the vehicle power supply, an intermediate voltage generator and a high voltage generator. Furthermore, a circuit is provided for heating the cathodes of the electron tubes.

Electrically speaking, the transmitter comprises only two stages, viz.: a crystal oscillator with a very low reactance taken on the oscillatory circuit of the plate of the oscillatory tube connected as a Colpitts oscillator circuit, and an amplifier stage directly fed from the oscillator stage and the tuned anode circuit of which is aligned in the no-load condition on the same frequency as the oscillator independently of the aerial circuit. Coupling with the aerial is effected at a distance over a co-axial conductor cable which may reach a length of 20 metres; said co-axial cable connects the transmitter shown on Figures 1 to 3 through a suitable outlet to the aerial box shown in Figures 7 and 8 without any appreciable loss of efficiency. Of course, it is possible through change-over switches 83 and 77 to change the co-axial cable and the aerial box.

As may be clearly seen on Figure 10 the oscillating unit contained in the right hand compartment of the casing shown in a plan view in Figure 2 comprises an oscillator tube 35 and a variable inductance 101 mounted on support 34. Said winding 101 is connected to the anode 102 of tube 35 through an interposed low resistor 103 for preventing any tendency of tube 35 to generate oscillations. Cathode 104 of tube 35 is electrically connected to an electronic beam deflector 105 and is de-coupled from earth through a resistor 106 in parallel with a condensor 107. Pilot grid 108 is connected to earth through a choke coil 109 and a resistor 110. Oscillator crystal 111 has one of its electrodes connected to grid 108 and the other electrode through interposed condenser 112 to the small oscillating vane 113 of a 2-positional change-over switch. Said vane 113 is connected to earth through interposed capacity 114, on the one hand, and is connected, on the other hand, to grid 115 of tube 35 through a choke coil 116 and a resistor 117 in series. Said grid 115 is, moreover, connected to earth through a capacity 118. The intermediate point between choke coil 116 and resistor 117 is connected to conductor 119 which supplies intermediate D.-C. to the feeding tube 35.

Contact vane 113 can engage with a terminal tap 120 of winding 101 or with another contact 121 forming an intermediate tap for the same winding 101.

That end of coil 101 which is connected to the anode 102 of tube 35 through the medium of resistor 103 is also connected to a capacitance formed of capacities 122 and 123 in series, capacity 123 being connected to earth. Arranged in parallel with capacities 122 and 123 is a small trimmer condenser 124 for matching the inductance values of tuning and amplification windings for both transmission ranges when tuning the transmitter.

The intermediate point between capacities 122 and 123 is connected to a conductor 125 for transmitting the currents flowing therethrough to the pilot grid of the amplifier tube described later. The values of the capacities of the bridge comprising capacities 122 and 123 are calculated for the purpose of obtaining the requisite actuating voltage suitable for a power tube. It is to be noted that the intermediate voltage current supplied to tube 35 through conductor 119 is interrupted at the keying rhythm or frequency, so that the plate and screen grid voltages of tube 35 are keyed in synchronism. Through this arrangement undue overloading of tube 35 is avoided.

As may clearly be seen on Figure 11 the amplifier unit comprises a tube 38 with indirectly heated cathode 126 which is connected to the earth. Grid 127 of tube 38 is connected in series to a choke coil 128 itself connected in series with a resistor 129 which resistor leads to a conductor 130; this conductor 130 leads to the negative pole of a high voltage direct current source, the positive pole of which is connected to the anode of tube 38 as will be described later. The electromotive force of this high voltage direct current source is substantially higher than that of the intermediate voltage direct current source which feeds the plate of tube 35. Connected in parallel with conductor 130 is a resistor 131 in series with a resistor 132 adapted to be short-circuited by a switch 133. Resistor 132 is connected at the other end to a conductor 134 connected to the negative pole of the medium voltage source connected in series to ground through the actuating winding 135 of the safety cut-out switch.

Screen-grid 136 of tube 38 is connected to a conductor 137 connected to the positive pole of the medium voltage source through an interposed resistor 138. The medium voltage is fed through conductor 137 also at the same rhythm as the keying rhythm, as described above for the supply of medium voltage to plate 102. Said grid 136 is de-coupled from earth through a resistor 139 in parallel with a condenser 140. An electron beam deflector 141 is connected to the earth. Anode 142 of tube 38 is fed from the positive pole of the high voltage direct current source through a conductor 143 on which a choke coil 144 is interposed. Anode 142 is connected through interposed capacity 145 to the tap 146 of a winding 147 wound on support 37 (Figure 2). Said tap 146 is connected to earth through a capacitor 148.

Winding 147 comprises a terminal tap 149 and an intermediate tap 150. A contact strip 151 may alternately engage with either tap 149 or 150. Said strip 151 is connected to earth through a capacitor 152 and to conductor 153 to which the above mentioned co-axial conductor is connected.

Said co-axial conductor 154 (Figure 12) leads the high frequency current amplified at the keying rhythm to an aerial box such as shown on Figures 7 and 8.

It is to be noted that, in the absence of keying, tube 38 is blocked owing to the connection of its screen grid 136 with earth through resistor 139. When keying begins, screen grid 136 is fed with the intermediate voltage at the same time as oscillating tube 35 through resistor 138 which limits the value of the screen grid voltage. The oscillatory circuit of anode 142 and that of anode 102 are identical as regards inductance and capacitance, the latter being fixed in both circuits in order to insure the constant alignment of the oscillatory circuits.

A bias is insured for grid 127 even in static operation through resistor 131 connected in series in the return circuit of the plate current to the negative pole of the high voltage source. When oscillations occur resistor 129 introduces an additional bias voltage.

During frequency-adjustment resistor 132 is introduced in series into the return circuit of the plate current in order to maintain a sufficient bias on grid 127. The insertion of this resistor is obtained by opening the contact strip 133 by one of the relays which will be described later. It is also to be noted that anode 142 is always supplied with a high voltage, this latter voltage being permanently applied when the transmitter is in action.

As may be seen on Figure 12 the coupling of the oscillatory circuit of amplifying anode 142 to the aerial is through a co-axial cable 154 the length and hence the capacitance of which has only a very small influence on the efficiency of the aerial, said length being such that it may reach 20 metres and even more. This is so because the capacitance of cable 154 added to the coupling capacity 15 does not much affect the adjustment of oscillatory circuit 147; the capacitance of a co-axial cable 20 metres long is about 1,000 micromicrofarads. Added to the value of capacitor 152 which is about 20,000 micromicrofarads it has only a very small influence on the resulting capacitance of the "pi"-shaped oscillatory circuit formed of capacitors 148 and 152 and winding 147, which resulting capacitance is very near 1,400 $\mu\mu f$. The variation imposed on said capacity is of about 1% between a minimum length for the co-axial cable and a maximum length for the same.

The transmitter being adjusted once for all in the laboratory when the aerial is de-coupled and thus under no-load, it is immaterial whether the aerial is disconnected at point A or at point B (Figure 12). Actually, for reasons of convenience in the change of connection the aerial boxes such as those which are shown on Figures 7 and 8 are disconnected at point B, that is to say at the inlet of co-axial cable 154 into the aerial box. This interruption of the circuit is obtained by means of relays controlled from the tuning box shown in Figure 9 through change over switch 77 placed in the waiting position or from the transmitter itself by change over switch 2 when placed in the adjusting position (Figure 1).

Furthermore, it is advisable to determine the value of capacitor 152 in order to match the transmitter with an aerial having a resistance of 10 ohms and a capacitance of 200 $\mu\mu f$. or 400 $\mu\mu f$. (with a wide percentage-range of approximation for the capacitance) since it is possible for the operator to tune the equipments directly with the maximum aerial current as measured with indicator 82.

Arranged in the aerial box shown on Figures 7 and 8 is a winding 155 placed on support 55, said winding 155 being shown diagrammatically on Figure 12 and also comprising an intermediate tap 156, a movable contact strip 157 actuated by relay 72 allowing one part of winding 155 to be directly switched on to the aerial 158 upon a change of the frequency range.

The distributed capacitance in the normally used aerial is shown diagrammatically by capacitor 159 indicated in dotted lines in Figure 12. For the "pi"-shaped oscillatory circuit 147, 148, 152 the matching ratio at resonance is equal to the ratio of the plate impedance to the load impedance. If the load impedance is a pure resistance the same will be true for the plate impedance. The inlet impedance of an aerial the length of which is smaller than a quarter wave-length as it is the case for the aerials ordinarily used for transmission with intermediate waves is a complex impedance formed of an important capacitive reactance and a very small pure resistance, the tangent of the angle which separates both vectors representative of these quantities being of the order of 200.

It is thus necessary to cancel this capacitive or negative reactance by a positive reactance in order that the load impedance should remain purely resistive. By transformation the impedance which will be present in the anode circuit of the power tube 38 and which will form the load resistance will also be purely resistive.

When these conditions are fulfilled the resonance of the oscillatory circuit of the power valve 38 with or without load will not be altered if the coefficient of overvoltage in load of the circuit is higher than or equal to 10. It is easy through known arrangements to obtain such an overvoltage coefficient.

On the other hand, the impedance reflected on plate 142 will always, except at resonance, be a complex impedance higher than that which is obtained at resonance.

It results from these considerations that when the windings and capacitors are matched in this manner the power required in the power stage will be a maximum when resonance is achieved and will decrease to either side of resonance. Under these conditions the aerial current follows the same variations and indicator 82 which directly or indirectly measures the aerial current as will be described later, allows practical adjustment of the inductances of the tuning circuits to the value which corresponds to the maximum reading on indicator 52. Furthermore these arrangements are particularly advantageous owing to the fact that an accidental detuning of the aerial circuit through connection with earth or a break in a conductor such as the aerial, for example, will impose no overload on the power stage and thus preserves the life of tube 38.

As has been just stated above the resonance of the aerial circuit corresponds to a maximum of the plate current in amplifying tube 38. This feature is made use of for effecting an automatic approximate tuning of the aerial in the aerial box.

As may clearly be seen on Figure 13 a relay 160 arranged in series between resistor 131 and resistor 132 is inserted in the return circuit of plate current 142. The winding of said relay 160 actuates a small contact vane 161. The rest contact of vane 161 leads to a conductor 162 and the active contact of vane 161 leads to a conductor 163. The winding 160 is so predetermined that it causes movement of vane 161 for a current value which is slightly lower than the minimum plate current obtained during the operation under load for the minimum voltage of the direct current supply. The function of this relay is as follows:

The aerial tuning motor 164 has a series-wound armature and two field windings 165, 166 equal and opposite in action; it is fed through one of its brushes by a conductor 167 connected to the positive terminal of the craft D.-C. supply. The other brush is connected between both field coils 165 and 166. Coil 166 is connected by a conductor 168 (Figure 14) to the contact plug 169 and a corresponding socket to contact 170 of contactor 84 (Figures 9 and 13). Field coil 165 is connected through a conductor 171 to a movable vane 172 of a relay to be described later, said vane having an active contact connected to earth in order to supply field winding 165 thus actuating motor 164. The vane 172 has a rest contact connected to a conductor 173. The conductor 173 leads to contact 175 of contactor 84 through a contact plug and a contact socket 174. The movable vane 176 of contactor 84 is urged to the neutral or breaking position by a return spring means, and is connected to a conductor 177 itself connected to conductor 163 through a contact plug and socket.

Connected to vane 161 (Figure 13) is a conductor 178 leading to a movable vane 179 the active contact 180 of which is connected to earth. Actuated at the same time as vane 179 is a vane 181 the active contact of which is connected to conductor 182 which supplies the intermediate D.-C. voltage, said vane 181 in turn being connected in particular to conductor 179. The relay which comprises vanes 179 and 181 forms the keying relay and its winding 183 is connected through conductor 167, on the one hand, to the negative terminal for example, and through conductor 184, on the other hand, to the positive terminal of the craft supply through a series-connected operating key, not shown, and also a contact strip of a safety relay to be described later.

Assuming accurate tuning has been achieved, it is necessary to take into account the fact that, during keying operation, the keying relay will oscillate and, consequently, the plate current of tube 38 is subjected to variations. Relay 160 can oscillate but owing to its time constant it does not instantaneously follow relay 183. It may thus occur that strip 179 is at rest at the same time as strip 161. Field winding 165 could be connected to earth if the relay which actuates blade 172 were maintained energized and, in practice, keying would lead to constant misadjustment of the aerial core 56.

In order to obviate this a relay 186 is mounted in series in supply circuit 167 the energization of said relay 186 being delayed through a condenser 187 mounted in parallel with winding 186, the assembly consisting of winding 186 and condenser 187 being supplied through a series resistor 188. This relay actuates vane 172 and at the same time a vane 189 connected to the winding of relay 70 which actuates the clutch dog 66. Said vane 189 has an insulated position of rest and in its active position it comes into contact with a grounded terminal, thus causing the energization of relay 70.

The operation of the above described device is as follows:

The transmitter having attained its position of rest, i. e. it has, by a process to be explained later been tuned to a frequency to be transmitted, together with its amplifying stage, and with the aerial connected but not tuned, if the operating key is now depressed in a constant manner, relay 160 will remain inactive. This is so because the anode circuit of amplifier tube 38 is not tuned and the current in the plate return conductor does not reach the above-mentioned minimum. Vane 161 remains on its rest contact and is connected to conductor 162. Vane 179 is in its active position and, consequently, through conductor 162, plug-and-socket unit 162a, and conductor 167 is connected to earth through resistor 188 and branch connections 186, 187. Condenser 187 charges slowly and when its charge reaches a certain level winding 186 becomes sufficiently energized. Vanes 172 and 189 move to active position. Clutch relay 70 is energized and clutch dog 66 engages on high gear. Through vane 172 field winding 165 is connected to earth and the aerial tuning motor begins to rotate; the motor will keep on running so long as the operating key is maintained depressed. Core 56 slides at high speed within aerial winding 155. As the inductance of this winding approaches its resonance value, the plate current of tube 38 increases and the relay controlled by winding 160 is energized, strip 161 moves to active position thus cutting off the ground return circuit of relay 186 which is immediately de-energized, condenser 187 being short-circuited through the winding. Strip 172 in its rest position insulates field winding 165 from earth and the armature 164 stops. Aerial core 56 is stopped in a position near that which it is to occupy at resonance. Approximate tuning is thus very quickly obtained.

In order to obtain accurate tuning the approximate tuning relay 160 being held, and the operator still maintaining the operating key depressed and the keying relay consequently energized, i. e. that strips 179 and 181 are in the active position, the white signal-lamp 81 is illuminated through wire 163 connected to earth as soon as approximate tuning has been obtained and remains alight. The operator thus being warned switches on one or the other of field windings 165 and 166 by means of the rocking key 84, the strip 175 of which is connected to earth through the same conductor 163, thus causing tuning core 56 to move forward or backward in small steps till the maximum anode current has been obtained for amplifying tube 38. The displacement speed of core 56 is then slowed down through the change in position of dog 66 under the action of relay 70 which is de-energized, strip 189 being in its insulated position of rest.

It is to be noted that the action of the delayed relay 186 during keying operation is as follows:

During keying operation if wire 162 is connected to earth during a short instant the aerial tuning motor 164 cannot run since the delaying action introduced by condenser 187 has allowed relay 160 to be energized and strip 161 to move to active position, thus insulating wire 162.

In order to make possible direct control of the aerial current, the aerial tuning box shown on Figure 7, further comprises the following arrangements show in Figure 15:

Arranged before winding 155 is a current transformer 190 the secondary winding of which is inserted between an earth de-coupling circuit consisting of a resistor 191 and a condenser 192, this side of the secondary winding comprising tap 193 which serves to supply indicator 82 and the parallel-connected anodes of a duo-diode 194. The cathodes of duo-diode 194 are de-coupled from earth through a resistor 195 and a condenser 196 in parallel. Said cathodes are connected, moreover, to the screen-grid of an amplifying tetrode 197. The current rectified by duo-diode 194 taken from the cathodes thereof is applied to the screen-grid of tetrode 197.

This tetrode 197 is connected for self-oscillation on an oscillatory circuit which comprises an iron induction coil 198 and a capacitor 199 both connected to earth. The control grid is protected by a capacitor 200 and the current is limited therein by a resistor 201 providing an earth return connection. The anode of the tetrode is connected to a transformer 202 which supplies telephonic currents to conductor 203 which leads to the monitoring head-set for listening-in to the keying operation as supplied from the aerial conductor.

The features of the electrical and mechanical arrangements of the apparatuses having thus been defined the electric control devices for the elements adjusting the transmission inductances, the oscillator and amplifier will now be described, which control may be effected immediately on the transmission box as shown in Figure 1 or at a distance therefrom through the box shown in Figure 9.

To each of the crystals 10, there correspond fixed contacts of two flat switch coils controlled from button 4. Said flat coils as shown on Figure 16 are those of the switch relating only to the mechanical control, and the switch coils mounted on the same shaft but serving to connect the crystals 111 between grid 108 and capacitor 112 have not been shown. The fixed and movable contacts of these flat coils which are not shown strictly coincide in angular positions to those of control button 4. Inserted in each position of this button 4 in the previously defined manner is one crystal and one only, the others being insulated. It is to be noted that the fixed positions of button 4 which are located by an index mark carried on said button are so set as to fall in stable positions and are resiliently locked by known means between two adjacent marks carried by the control board of the casing.

Inasmuch as the apparatus is intended for transmission over two frequency ranges it comprises two circuits tuned to the standard crystal frequencies, which circuits are different and have not been shown. It is possible by means of button 4 to distribute any number of the six crystals in one or the other of the ranges. It is only necessary to stop the index mark carried by button 4 between both adjacent positions designating the crystals, in order that all the crystals which correspond to the positions on one side of the mark will be connected to one of the frequency ranges, whereas all those which are on the other side of this position will be connected to the other frequency range, only one crystal, however, remaining inserted in the oscillator circuit.

The switch coils responsible for this last-mentioned function of distributing the crystals over the frequency ranges have not been shown in the drawings, as they are well known and require no further description.

Knob 4 controls accordingly two multi-tapped flat coil or "pi" switches Co2 and Co4 diagrammatically shown in Figure 16 in developed form. Switches Co2 and Co4 are formed on their rotor parts wth sectors S1, S2 and S3, S4 respectively, the sectors in each pair being spaced by an insulating gap which registers with a point intermediate two successive contacts corresponding to the crystals, the successive contacts respectively correspond to one another as from one switch to the other, as shown e. g. for contacts 10c and 10b and contacts 10h and 10i respectively in Fig. 16. Leading from each of the contacts 10a, 10b, 10c . . . 10i is an electric conductor which leads to contacts 49a, 49b . . . 49f of circuit-breakers 49 (Figures 2 and 4). The corresponding contact strips of circuit-breakers 49 are connected each through a conductor to fixed contacts a1, a2 . . . a6 of a switch in the form of a flat or "pi"-shaped coil Co1A controlled by knob 3. The same knob 3 controls a pi-coil switch Co3a. These pi-coils are identical and each comprise six fixed contacts or segments a1 . . . a6 and c1 . . . c6 corresponding in angular positions to one another as from one coil to the other and a movable brush adapted to contact the fixed segment-knob 3 has diagrammatically been shown on Figure 16 by a connection in chain lines connecting the movable brushes of switches Co1a and Co3a. In the contact box shown in Figure 9 two pie-coils Co1b and Co3b identical with coils Co1a and Co3a are arranged. Said coils are controlled by knob 78 shown in a similar manner in the figure. The fixed contact segments of coil Co1b are connected in parallel with the fixed contacts of coil Co1a on the conductors which connect the latter to circuit-breakers 49 respectively. Likewise, the fixed contacts d1 . . . d6 of contactor Co3b are connected in parallel to contacts c1 . . . c6 of contactor Co3a. The contacts c1 . . . c6 are connected to contacts 10g . . . 10l of switch Co4.

The movable brush of switch Co1A is connected to the end fixed contact of a double three-positional switch controled by a knob 2. Likewise, the movable brush of contactor Co3a is connected to the corresponding end fixed contact of the second part of this double switch. The movable brushes of switches Co1b and Co3b are connected to the opposed end contacts respectively of the same double switch. The movable brushes 2a and 2b of this double switch are connected to earth.

The sectors S1 and S4 are connected to a conductor 205. The sectors S2 and S3 are connected to a conductor 206. Said conductors 205 and 206 lead to two fixed contacts of a switch Co5. The rotor of switch Co5 is angularly connected to the rotor of a switch Co6 and of a switch Co7, said connection being indicated in the figure in the previously-described manner. All these switches are provided in the shape of flat or pi-coils and the quick-make-and-break rotors thereof are controlled by the releasing device of the "tumbler" type 45 shown in Figure 2, said device being actuated by finger 44 (Figure 3).

The insulating rotor of switches Co5 is provided with conductive sectors on both its faces, said sectors S5 and S6 on one side and S7, S8 on the other side being adapted to contact various contact segments spaced over the periphery of the rotor on the stator.

Wire 205 leads to a segment 207 which can contact strip S6 alone and wire 206 leads to a segment 208 which can contact strip S5 alone. Arranged on the stator of contactor Co5 are the following contact segments taken in the order which corresponds to a clockwise displacement:

A segment 209 connected by a conductor 210 to the winding of a relay 211 fed from the craft supply mains on a conductor 212, said conductor 212 serving to feed motor 13;

A segment 213 adapted to contact both strips S8 and S6 by means of a cross-over conductor;

The segment 207 adapted to contact strip S6 only;

An insulated segment 214;

A segment 215 adapted to contact strip S7 and which is connected by a conductor 216 in parallel with conductor 210;

A segment 217 adapted to contact strip S5 and S7;

The aforementioned segment 208;

A segment 218 connected by a conductor 219 to a relay 220 which is to be described later.

Segment 218, when in contact with sector S5, defines the end-of-stroke position of the rotor of switch Co5. In this position strip S5 interconnects segments 208 and 218. Relay 220 fed by a conductor 221 from the craft supply has its winding connected to earth and is energized. It closes contacts 156—157 (Figure 12) which short-circuits the mid-tap of coil 155 to the aerial and tunes said coil 155 on one of the two frequency ranges. The earth connection is completed over conductor 206, segment S3, one of contacts 10g to 10h, one of contacts c1 to c6 and d1 to d6 and the movable brush 2b in one of its end positions.

In this same position of the rotor of switch Co5 segment S7 is in contact only with contact 217 and this latter is insulated. Segment S6 interconnects contacts 207 and 213 and segment S8 interconnects contacts 209 and 213; this position corresponds to that shown in Figure 16.

In the other position segment S5 insulates contact 218 and contacts 156–157 can open, relay 220 being de-energized. Said segment S5 interconnects contacts 208 and 217. Segment S7 interconnects contacts 215 and 217. Segment S6 insulates contact 207 and segment S8 insulates contact 213.

Simultaneously with this sudden rotation of the rotor of switch Co5 the rotors of pi-coil switches Co7 and Co6 operate contacts equivalent to strips 113 and 151 (Figures 10 and 11) so that contact strips 113, 151 and 157 are operated synchronously, thus completing the necessary circuits for tuning the oscillatory winding 101, amplifier winding 147 and aerial tuning winding 155 in both ranges.

Series motor 13 comprises two oppositely-acting field windings 222 and 223 as well as two retarding windings 224, 225 in parallel with the field windings. Rotor 13 of this direct current motor has its brushes arranged between the field windings 222 and 223 and between the retarding windings 224, 225. Feeding conductor 212 leads to the brush which is connected between the retarding windings. Field winding 222 and retarding winding 224 are moreover interconnected with contact 217 whereas field winding 223 and brake winding 225 are connected with contact 213.

Relay 211 controls two contact strips: the one 211a has a rest contact connected to conductor 212 and is itself connected to signal lamp 80 (Figure 9) through a conductor 226; the other strip 211b has rest contact connected to conductor 184 (Figure 13) in the feeding circuit of keying relay 183, said strip 211b being itself connected to the supply circuit by mains terminal 227, with or without interposition of the signalling key (not shown), according as this manipulator is itself connected to the circuit of relay 183 on the earth side or on the supply side. Said safety relay 211 furthermore controls strip 133 shown in Figure 11.

The operation of the device shown on Figure 16 is then as follows:

When knob 2 is in one of its active positions it can enable either switches Co1b, Co3b or switches Co1a, Co3a respectively for remote frequency adjustment or for adjustment of the frequency from a point at the station, i. e. by means of knob 78 or by means of knob 3. Both these modes of operation are equivalent. The description of one of them will be sufficient, and the type of operation involving adjustment on the control board of the transmitter will be described by way of example.

With knob 3 placed, for example, in the second position (contacts a2, c2 engaged by the brushes and connected thereby to earth) if the circuit-breaker 49b is closed, that is to say if the pusher 48b is located at some other point of the periphery of disc 23 than in the corresponding notch 27, the current conveyed over conductor 212 follows the following circuit: conductor 212, rotor 13, field winding 221, segment 213, strip S6, segment 207, conductor 205, strip S1, segment 10b, contact 49b, segment a2, brush 2a, and earth. Rotor 13 starts revolving. Motor 13 drives hub 22, worms 28 and 29, cores 33 and 36 until the corresponding notch 27 opens circuit-breaker 49b and rotor 13 stops under the action of retarding winding 225. Tuning of the oscillatory and amplifying windings is now accomplished, since the positions of notches in the discs were predetermined in the laboratory for this purpose for each of the frequencies defined by the crystals mounted in the apparatus.

If knob 3 is displaced there are two cases to consider, viz.: First, the case in which the position reached by knob 3 corresponds to a crystal the oscillatory frequency of which lies in the same range as the preceding crystal 2 or, second, a crystal which will oscillate in another range of frequency. If knob 3 is brought on position 1 (contacts a1, c1) this position corresponds to the former case. If knob 3 is brought to one of positions 3 to 6 (contacts a3 to a6, c3 to c6) there is a change of the frequency-multiplying range.

For the positions shown on Figure 16, with knob 3 brought to position a3, the opened circuit-breaker 49b has no more action and the current passes through circuit-breaker 49c which is closed by the following circuit: wire 212, rotor 13, field winding 221, segment 213, strip S6, segment 207, conductor 205, strip S4, segment 10i, segment c3, brush of switch Co3a, brush of switch 2b and earth. The motor is set into rotation whether circuit-breaker 49c is opened or closed. During this movement finger 44 engages the releasing device 45 and causes it suddenly to rock causing a change of position of the rotor common to switches Co5, Co6 and Co7. The circuit is now established as follows: wire 212, armature 13, field winding 222, segment 217, strip S5, segment 208, conductor 206, strip S2, segment 10ca, circuit-breaker 49c, segment a3, movable brush of contactor Co1a, movable brush 2a and earth. Motor 13 stops as soon as finger 48c falls into the corresponding notch 27. It is to be noted that the action of switch Co5 caused the reversal of the direction of rotation of rotor 13 by switching from one field winding to the other; this change occurs as the cores 33 and 36 have reached one end of their strokes, under the action of the releasing device 45. Switch Co4 was disabled by the rotation of strip S6 which insulated segment 207.

If switch 3 had been brought from its initial position 2 to position 1 (contacts a1, c1) the circuits would have been established in the following manner, assuming that the notch 27 corresponding to circuit-breaker 49b of the first position has been passed by in the corresponding direction of rotation of the motor; wire 212, armature 13, field winding 221, segment 213, strip S6, segment 207, strip S1, segment 10a, circuit-breaker 49a, segment a1, brush of switch Co1a, brush 2a and earth. The armature 13 continues to revolve in the same direction without disc 23 presenting any notch below pusher 48 of circuit-breaker 49a. The cores 33 and 36 proceed on their full stroke until finger 44 causes the releasing switch 45 to rock. At this moment the following circuit is established: wire 212, armature 13, field winding 222, segment 217, strip S5, wire 206, strip S3, segments 10g and c1, brush of switch Co3a, brush 2b and earth. Armature 13 begins to rotate in the contrary direction. Cores 33 and 36 accomplish the entire stroke in the reverse direction until they have reached at the other end of their stroke, when finger 44 causes a new rocking movement of the releasing switch 45 thus re-establishing the preceding circuit. Now motor 13 will stop as circuit-breaker 49a opens.

If switch Co4 is displaced for changing the assignment of the crystals to the respective frequency ranges, assuming that the crystal of order 2 corresponding to contact 10b shifts from engagement with strip S3 to engagement with strip S4, motor 13 will stop when the corresponding notch 27 will open circuit-breaker 49b during rotation in a direction reverse from that above-described.

Furthermore, in order to prevent any keying operation at the transmitter while the adjusting members of the amplifier-transmitter are in movement, relay 211 is connected to the supply wire 212 and to segments 209 and 215. In one position of the rotor of switch Co5 segment 209 is connected to segment 213 connected to earth through field-windings 221 and 222 whereas segment 215 is insulated in the same position. For the other position, strip S8 insulates segment 209 from segment 213, whereas strip S7 connects segment 217 to segment 215. So long as the earth connection remains established for motor 13 and so long as this motor rotates, relay 211 remains energized. Strips 211a, 211b in active position interrupt the energizing circuits for signal lamp 80 and keying relay 183. Furthermore, strip 133 remains open thus preserving tube 38. The operator is informed of the attainment of the correct condition for the amplifier-transmitter when signal lamp 80 lights up.

He can then depress the operating key in order to effect first the approximate and quick tuning adjustment, and then the precise and slow tuning adjustment of the aerial as described above. After the indication of the measuring instrument 82 has reached a maximum he can proceed with the transmission keying operations.

It will be understood that without departing from the spirit and scope of the invention, modifications may be made in the above described forms of execution. Thus in particular, such a transmitter may be used for radiotelephony by providing a microphone current modulator, the operating key remaining permanently closed.

I claim:

1. A radio transmitting apparatus comprising an amplifier having an output circuit, an antenna system comprising an antenna and a variable reactance device connected to said antenna for varying the impedance thereof, means operable at will to connect or disconnect said reactance device and the output circuit of said amplifier, means for tuning said amplifier to a desired frequency with said reactance device disconnected therefrom, an operating key for effecting the transmission of radiant energy by said apparatus when said antenna system and amplifier are connected and tuned to the same frequency, means responsive to the actuation of said operating key when said antenna system and amplifier are connected but not tuned to the same frequency to vary the reactance of said device, means delaying the response of the last named means for a time exceeding the duration of the maximum normal keying interval of said apparatus, and a relay responsive to the output of said amplifier when said device is connected thereto and tuned to the same frequency to disable said delay means.

2. In a radio transmitting apparatus comprising, means for generating a carrier wave, keying means for said carrier wave generating means and an antenna system having the output of said carrier wave generating means applied thereto and comprising an antenna and a variable inductance tuning coil therefor; means for tuning said antenna system to the frequency of said carrier wave, said tuning means comprising, means for varying the inductance of said coil, an energizing circuit for said inductance varying means, said energizing circuit being normally incomplete, a first relay actuated by the operation of said keying means and operable to complete said circuit, and a second relay actuated by the output of said generating means when said antenna system is tuned to approximate coincidence with said carrier wave frequency, said second relay terminating the operation of said first relay when actuated, said first relay having associated therewith means for delaying the actuation thereof following the operation of said keying means for an interval greater than the duration of the normal signal impulses of said transmitting apparatus, said delay means comprising a condenser shunting said first relay and means connecting a source of potential across said condenser and the winding of said first relay when said keying means is operated.

3. In a radio transmitting apparatus comprising, means for generating a carrier wave, keying means for said carrier wave generating means and an antenna system having the output of said carrier wave generating means applied thereto and comprising an antenna and a variable inductance tuning coil therefor: means for tuning said antenna system to the frequency of said carrier wave, said tuning means comprising, a motor for varying the tuning of said coil, an energizing circuit for said motor, a first switch in said energizing circuit, said switch normally interrupting said energizing circuit, a relay operable to actuate said switch and complete said energizing circuit, a normally incomplete energizing circuit for said relay, means actuated by the operation of said keying means to complete said relay energizing circuit, means in said relay energizing circuit delaying the acting of said relay following the completion of said relay actuating circuit by an interval greater than the normal duration of a signal impulse of said transmitting apparatus, a second switch in said relay energizing circuit, said second switch normally being closed, and means responsive to the amplitude of the output of said transmitting apparatus to open said second switch and thus render said relay energizing circuit incomplete when said antenna system is tuned to approximate coincidence with the frequency of said carrier wave.

References Cited in the file of this patent

UNITED STATES PATENTS

| | | |
|---|---|---|
| 2,055,546 | Luke | Sept. 29, 1936 |
| 2,102,904 | Levy | Dec. 21, 1937 |
| 2,206,820 | Mydlil | July 2, 1940 |
| 2,244,725 | Peterson | June 10, 1941 |
| 2,250,578 | Finch | July 29, 1941 |
| 2,364,637 | Lear | Dec. 12, 1944 |
| 2,415,427 | Hings | Feb. 11, 1947 |
| 2,430,173 | Holmes | Nov. 4, 1947 |
| 2,438,116 | Dodds et al. | Mar. 23, 1948 |
| 2,498,340 | Morrison | Feb. 21, 1950 |
| 2,502,396 | Vogel | Mar. 28, 1950 |
| 2,504,967 | Edinborogh | Apr. 25, 1950 |
| 2,515,436 | Babin | July 18, 1950 |
| 2,602,887 | Brown | July 8, 1952 |

OTHER REFERENCES

Radio and Television News, May 1949, pages 68 and 69.